United States Patent
Byun et al.

(10) Patent No.: US 7,576,926 B2
(45) Date of Patent: Aug. 18, 2009

(54) SPILL LIGHT REMOVING DEVICE

(75) Inventors: Sung-Ho Byun, Suwon-si (KR);
Haeng-Seok Yang, Bucheon-si (KR);
Sung-Kyong Oh, Suwon-si (KR);
Eui-Joong Kim, Suwon-si (KR);
Byoung-Ki Song, Suwon-si (KR);
Koan-Young Oh, Yongin-si (KR)

(73) Assignee: Samsung Electro-Mechanics Co., Ltd.,
Suwon (KR)

( * ) Notice: Subject to any disclaimer, the term of this patent is extended or adjusted under 35 U.S.C. 154(b) by 0 days.

(21) Appl. No.: 12/135,957

(22) Filed: Jun. 9, 2008

(65) Prior Publication Data

US 2009/0009849 A1    Jan. 8, 2009

(30) Foreign Application Priority Data

Jul. 2, 2007    (KR) ...................... 10-2007-0066058

(51) Int. Cl.
*G02B 9/00* (2006.01)
*G02B 5/18* (2006.01)

(52) U.S. Cl. ...................... 359/738; 359/558; 359/566; 359/568; 359/569; 359/570; 359/571; 359/572; 359/707; 359/722

(58) Field of Classification Search ................. 359/707, 359/722, 738, 558, 566, 568–572
See application file for complete search history.

(56) References Cited

U.S. PATENT DOCUMENTS 7,319,509 B2 *    1/2008    Singer .......................... 355/71
7,456,957 B2 *    11/2008    Everett et al. ............... 356/328

\* cited by examiner

*Primary Examiner*—Evelyn A. Lester
(74) *Attorney, Agent, or Firm*—Christensen O'Connor Johnson Kindness PLLC

(57) ABSTRACT

A spill light removing device includes a first blocker which is located perpendicularly to a stream route of light being irradiated from a light source and blocks a stream of light that is incident to the surface of the first blocker, except on a hole formed on the first blocker; a pass-through tunnel which is connected to the hole and is formed in the same direction to the stream route of light and allows the stream of the light to pass through; and a second blocker which has a irregularity pattern that is formed on a inner wall of the pass-through tunnel and reflects the light that is incident in the deviated direction of the stream route of light.

7 Claims, 8 Drawing Sheets

SPILL LIGHT REMOVING DEVICE

CROSS-REFERENCE TO RELATED APPLICATIONS

This application claims the benefit of Korean Patent Application No. 10-2007-0066058 filed on Jul. 2, 2007 with the Korean Intellectual Property Office, the disclosures of which are incorporated herein by reference in their entirety.

BACKGROUND

1. Technical Field

The present invention is related to a spill light removing device, more specifically to a spill light removing device using an irregularity pattern.

2. Description of the Related Art

FIG. 1 and FIG. 2 show the spill light removing device according to the prior art. Referring to FIG. 1, according to the prior art, spill light which is incident light from disordered directions is eliminated by using a simple shaped diaphragm. The spill light, parts of the light being irradiated from a light source 101, is blocked by a blocker 110 of the diaphragm.

FIG. 2 shows a perspective view of the block 110 of the spill light removing device according to the prior art. As shown in FIG. 2(a) and FIG. 2(b), the blocker can have various shapes and no limitation.

But, if by those types, since an incidence angle is not large, spill light which passes diagonally through a tunnel 130 of the diaphragm or spill light that arrives a open entrance of the diaphragm and is reflected to irregular directions at the inner wall 120 of the tunnel 130, may pass the diaphragm as it is.

Referring to FIG. 1, at the inner wall 120 of the tunnel 130, there is no particular device or structure for eliminating the spill light. Therefore, the spill light reflected by the inner wall 120 passes through the tunnel from the light source eventually, even though directions of the spill light are changed.

As a result, according to the prior art, because only the blocker 110 must eliminate the spill light, it is impossible to eliminate the spill light effectively.

SUMMARY

The present invention aims to provide a spill light removing device which eliminates spill light incident from random directions And the present invention aims to provide a spill light removing device which improves the efficiency of display by removing spill light incident from random directions.

Also the present invention aims to provide a spill light removing device which eliminates the spill light of an optical module by reflecting the spill light incident into the inside of a diaphragm and not allowing the spill light to pass the diaphragm.

Still the present invention aims to provide a spill light removing device which can be applicable to an optical module easily due to its simple structure.

Yet, the present invention aims to provide a spill light removing device which improves a contrast ratio (C/R) of an image displayed.

An aspect of the invention features a spill light removing device.

According to an embodiment of the present invention, a spill light removing device includes a first blocker which is located perpendicularly to a stream route of the light being irradiated from a light source and blocks a stream of the light that is incident to the surface of the first blocker, except to a hole formed on the first blocker; a pass-through tunnel which is connected to the hole and is formed in the same direction to the stream route of the incident light and allows the stream of light to pass through; and a second blocker which has a irregularity pattern that is formed on a inner wall of the pass-through tunnel and reflects the light that is incident in the deviated direction of the stream route of light.

The spill light removing device can further includes a collimating lens which parallelizes the light that is irradiated from the light source or the pass-through tunnel with a light axis.

The second blocker can be a screw thread shaped.

A radius of the pass-through tunnel can be decreasing with being further from the light source.

At least one of the height and inclination of the irregularity pattern formed on the second blocker can vary with the distance from the light source.

The irregularity pattern on the second blocker can include a curved surface on one side of the irregularity pattern.

The irregularity pattern can have a concave curved surface to the light source direction.

DETAILED DESCRIPTION

Figure 1:
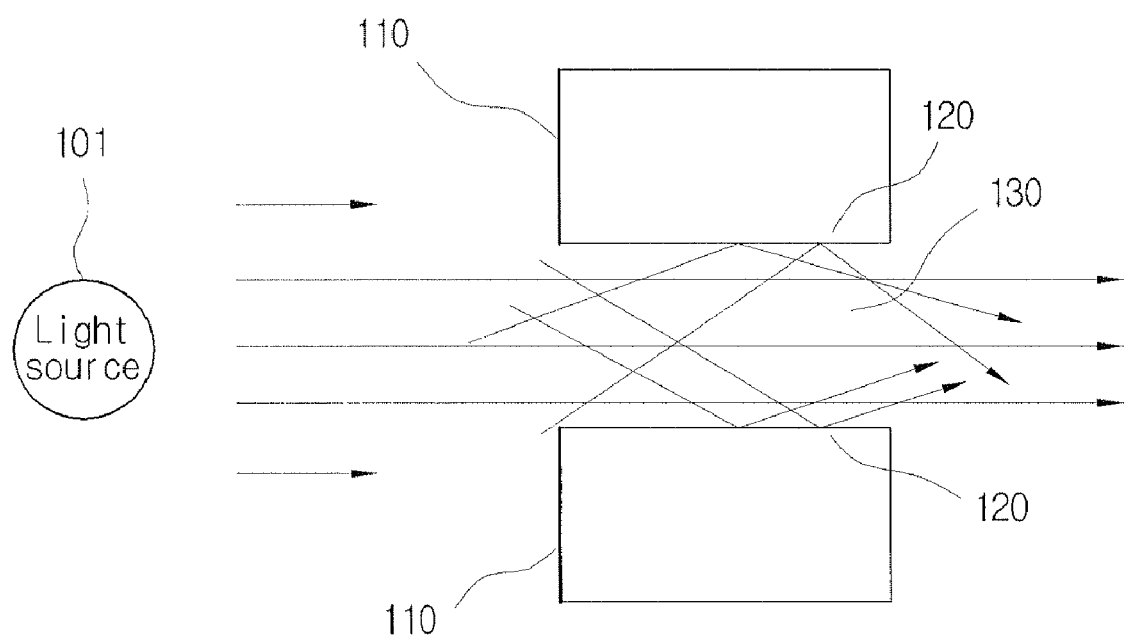
FIG. 1 is a cross sectional view of a spill light removing device according to the prior art.
Figure 2:
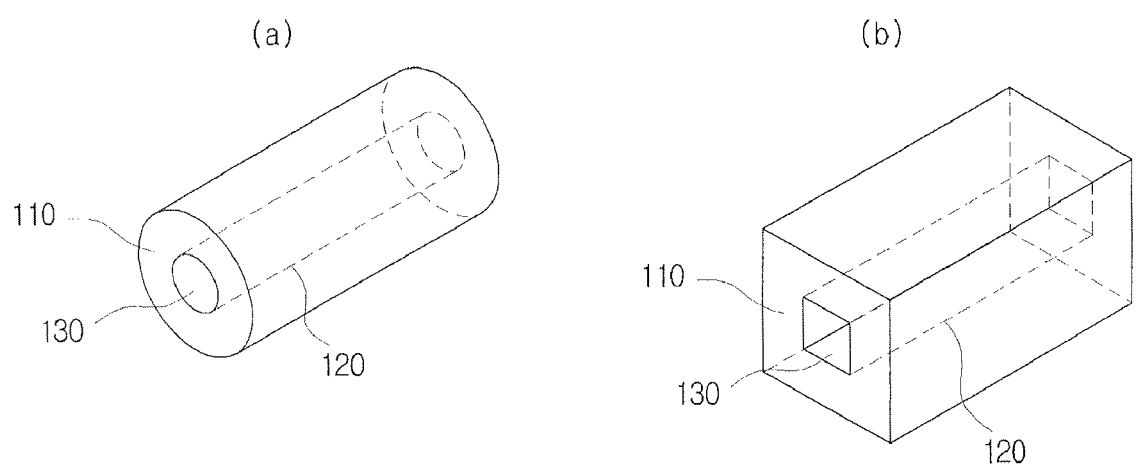
FIG. 2 is a perspective view of a spill light removing device according to the prior art.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Figure 3:
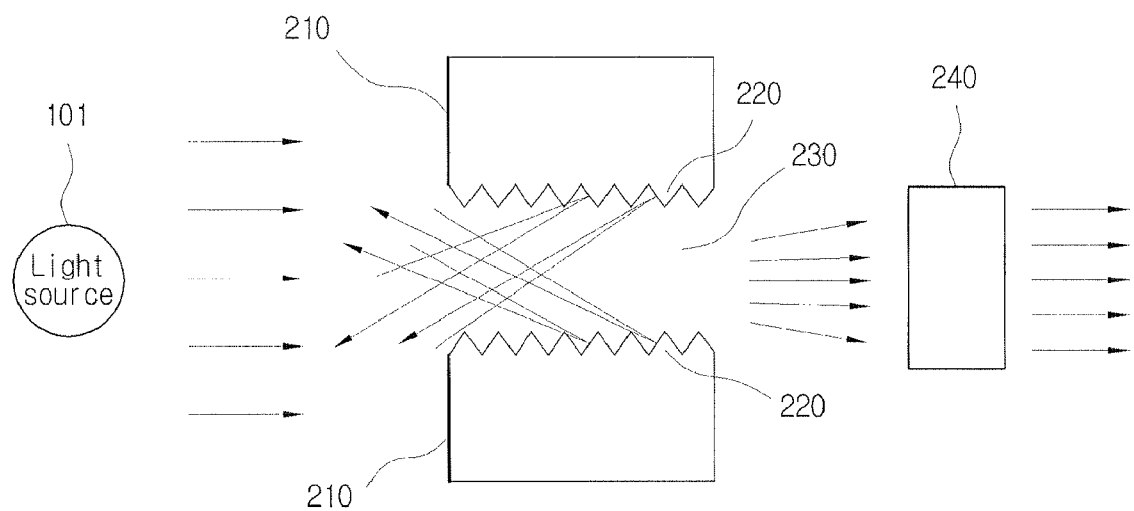
FIG. 3 is a cross sectional view of a spill light removing device according to an embodiment of the present invention.
Figure 4:
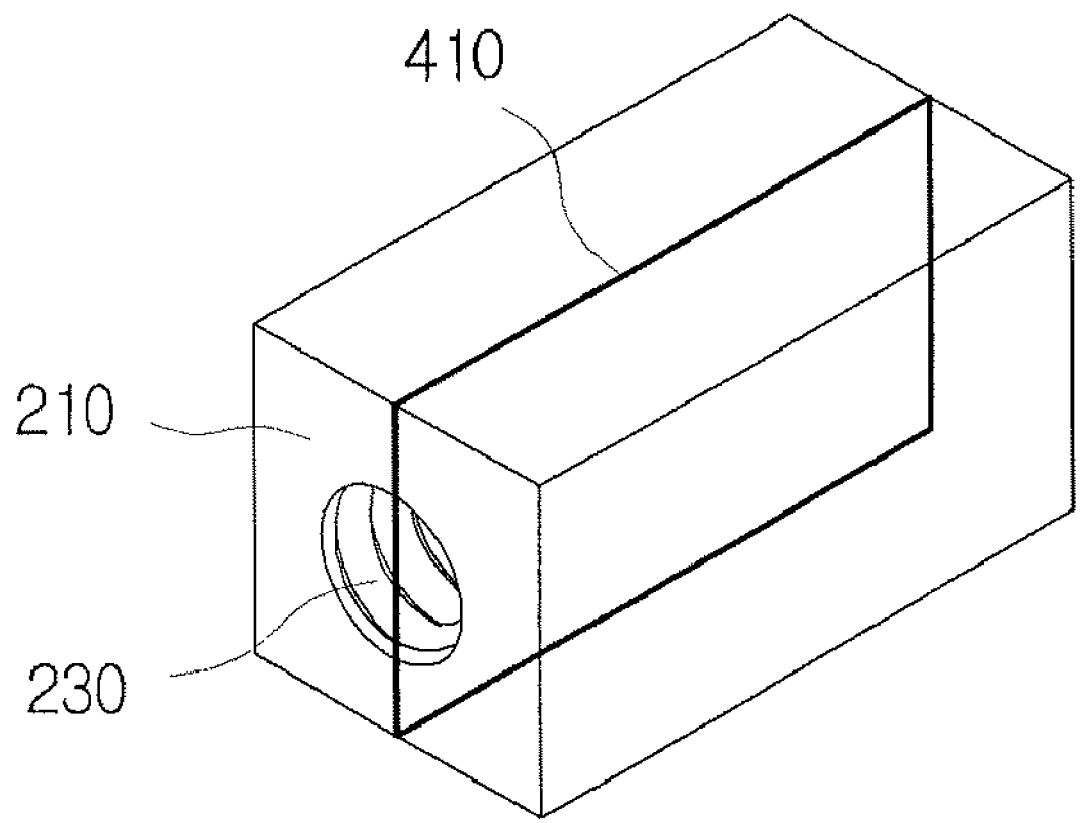
FIG. 4 is a perspective view of a spill light removing device according to an embodiment of the present invention.
Figure 5:
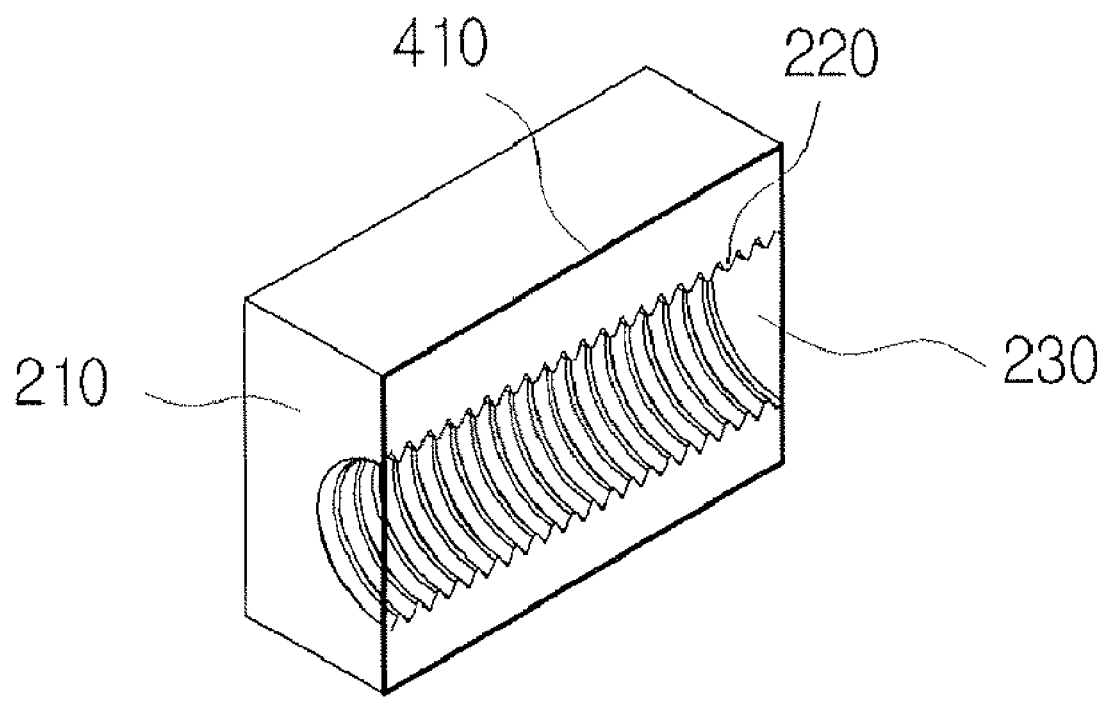
FIG. 5 is a solid view illustrating one cross section of a spill light removing device of FIG. 4 when it is sliced into two pieces.

FIG. 3 to FIG. 5 show spill light removing devices according to embodiments of the present invention.

FIG. 3 is a cross sectional view of a spill light removing device according to an embodiment of the present invention. FIG. 4 is a perspective view of a spill light removing device according to an embodiment of the present invention. FIG. 5 is a solid view illustrating one cross section of a spill light removing device of FIG. 4 when it is sliced into two pieces.

Referring to FIG. 3, a spill light removing device according to an embodiment of the present invention can include a first blocker 210, a second blocker 220, and a pass-through tunnel 230. A spill light removing device according to an embodiment of the present invention can be a diaphragm which has a pass-through tunnel with irregular pattern surface wall inside.

If it is assumed that the spill light removing device of FIG. 4 is cut in two, a solid view of one cross section 410 of the spill light removing device can be derived as in FIG. 5. Referring to a solid view in FIG. 5, a shape of inner wall with a irregularity pattern is described three dimensionally.

A collimating lens 240 is the lens which parallelizes the light that is incident on the lens and makes it parallel light. A collimating lens 240 according to another embodiment of the present invention can be included in the spill light removing device.

It is rare that light from the light source 101 is consisted with only light needed for display and it is common that the spill light caused from an error or tolerance of components or arrangement of light source 101 or the diffused reflection is outputted along with the light for display. This spill light deteriorates performance of display or quality of image. Therefore, elimination of the spill light is important in optical or display modules.

The spill light proceeds irregularly and to random angles. Therefore, the spill light veers off the stream route of the effective light that is to be used for display. Out of the light irradiated from the light source, the spill light, except the light that is to be used for display, is blocked by a first blocker 210.

In a first blocker 210, there is a hole which is connected to the pass-through tunnel 230. On the inner wall of the pass-through tunnel 230, a irregularity pattern is formed. The inner wall with the irregularity pattern is a second blocker 220.

If there is no irregularity pattern at the second blocker 220, the spill light is reflected by the same angle with the incident angle and can be outputted to the opposite direction of light source 101.

But, if the spill light is incident into the pass-through tunnel 230, the spill light is incident on a part of the irregularity pattern of the second blocker 220, reflected by the irregularity pattern to the light source and is out from the passing panel 230. By aforementioned process, the effective light, the light in which the spill light is removed by the first blocker 210 and the second blocker 220, passes through the pass-through tunnel 230.

The effective light outputted through the pass-through tunnel 230 may be a non parallel light because of processing error or diffraction phenomenon. Therefore the effective light which is non parallel and irregular due to ununiform routes can be adjusted to the parallel light by passing through a collimating lens 240. The collimating lens 240 can be included in spill light removing device, or separated from the spill light removing device according to another embodiment.

And, in FIG. 3, the collimating lens 240 is installed at the back side of the pass-through tunnel 230 with a certain distance but the distance between the collimating lens 240 and the pass-through tunnel 230 or the light source 101 is not limited and according to another embodiment of the present invention the collimating lens 240 can be set up between the light source 101 and the blocker 210.

Figure 6:
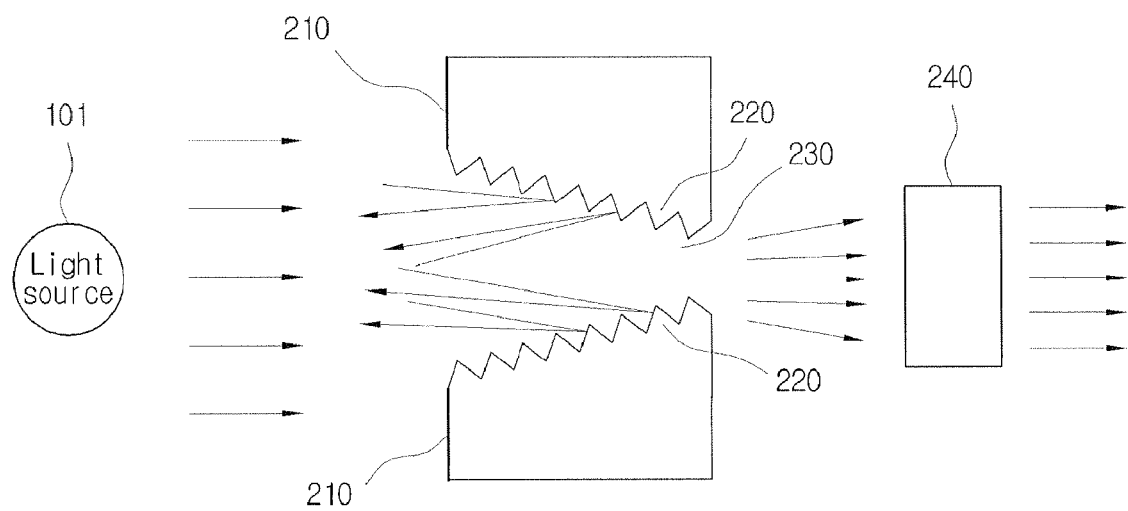
FIG. 6 is a cross sectional view of the spill light removing device according to another embodiment of the present invention.

FIG. 6 is a cross sectional view of the spill light removing device according to another embodiment of the present invention.

Referring to FIG. 6, the radius or width of the pass-through tunnel 230 can be decreased with being further from the light source 101.

By such changes in the radius of the pass-through tunnel 230, the spill light incident with random incident angles may be reflected toward the opposite direction of light stream direction (toward the light source 101) and eliminated and coverage of the spill light which can be eliminated can be wide.

If the pass-through tunnel 230 is a cylinder shape with a constant radius, the spill light with a small incident angle may pass through the pass-through tunnel 230 without reflection. So if the radius of the pass-through tunnel 230 is decreased with respect to the direction of light path, then the spill light with a small incident angle can be reflected by the irregular pattern in far side from the light source 101 and eliminated.

Figure 7:
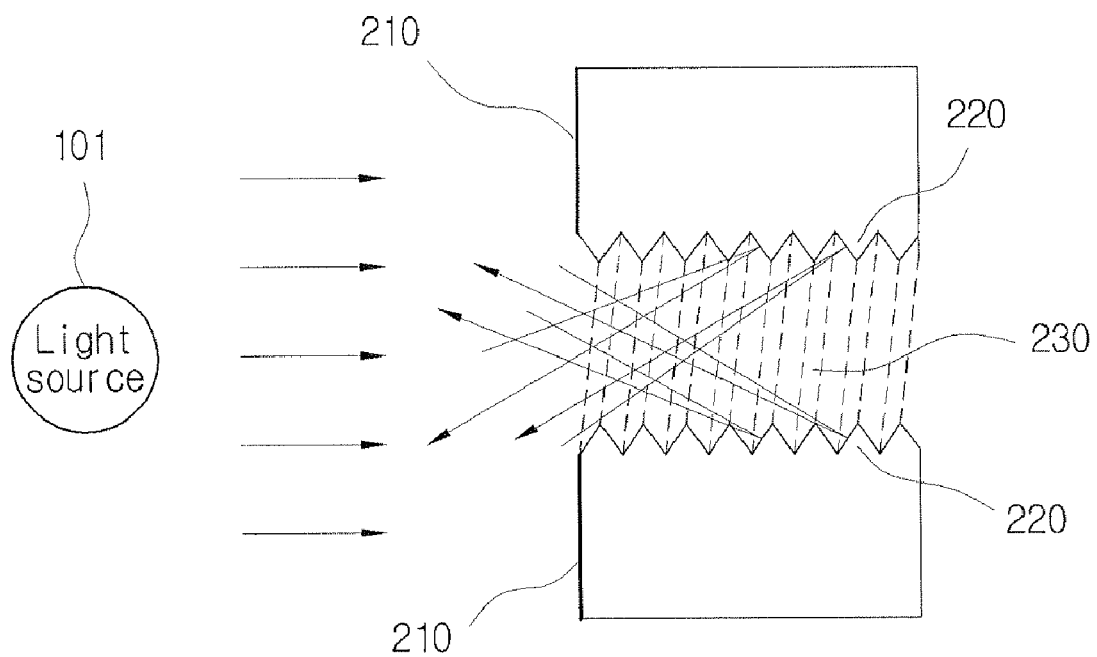
FIG. 7 is a cross sectional view of a spill light removing device according to another embodiment of the present invention.

FIG. 7 is a cross sectional view of the spill light removing device according to another embodiment of the present invention.

Referring to FIG. 7, the spill light removing device can include a first blocker 210, a second blocker 220, and a pass-through tunnel 230. Here, referring to FIG. 4, the second blocker 220 can have an irregular pattern with the screw thread shape.

The spill light removing device in FIG. 7 can also have the shape corresponding to the three dimensional views in FIGS. 4 and 5. The three dimensional view of FIG. 7 is the same view with ones in FIGS. 4 and 5 except that the irregular pattern is not triangle shaped but screw thread shaped, therefore overlapping explanation is to be omitted.

The advantage of the second blocker 220 with a screw thread shape is that the formation of the screw thread shape may be easier because the pass-through tunnel and the irregular pattern can be simultaneously formed by penetrating a positive screw into an object in which the pass-through tunnel is to be formed.

Therefore a screw thread shape of the second blocker 220 can be a negative screw shape. And a shape of a screw thread can be various depending on the shape of the screw that is used in the formation of the pass-through tunnel 230.

The process, which the spill light is eliminated by the first blocker 210 primarily and then the light incident into the pass-through tunnel 230 is eliminated by the second blocker 210 secondarily, is overlapped with that described in FIG. 3 to FIG. 6 and thus the detail description is omitted.

Figure 8:
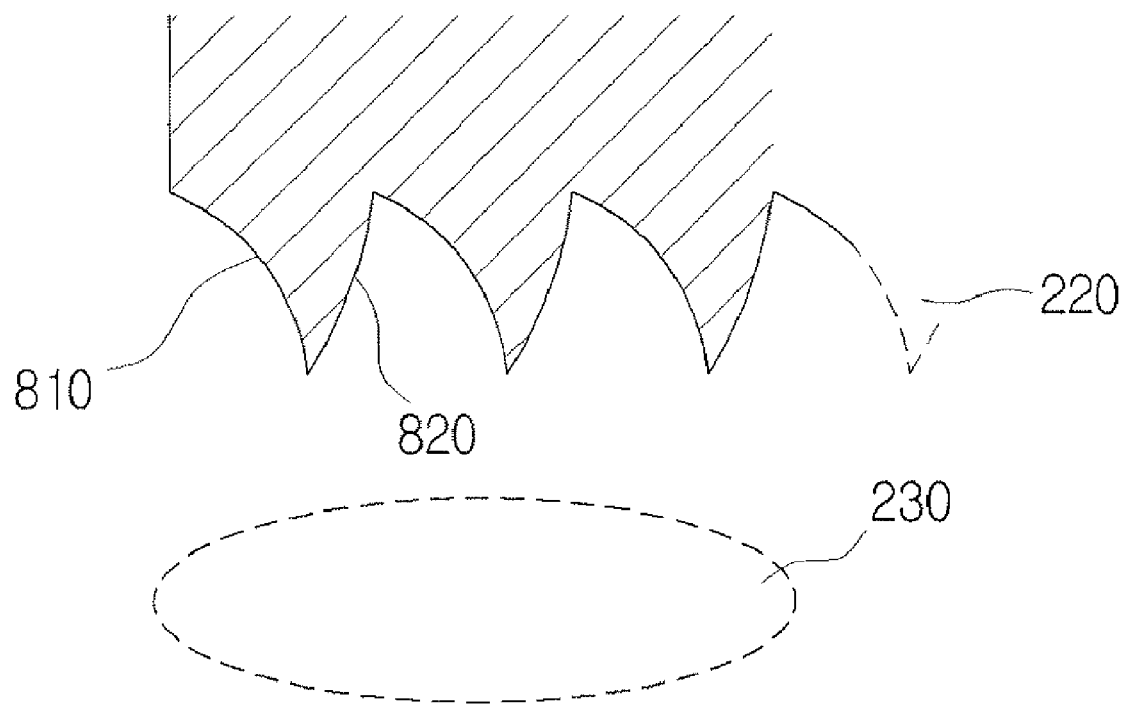
FIG. 8 is an irregularity pattern of the second blocker of a spill light removing device according to another embodiment of the present invention.

FIG. 8 shows an irregular pattern of a second blocker 220 in the spill light removing device according to an embodiment of the present invention.

The irregular pattern of the second blocker 220 can have a fore-face 810 and a back-face 820. The fore-face 810 is the surface toward the light source and the back-face 820 is the surface except the fore-face 810 out of total irregular pattern surface.

The fore-face 810 and the back-face 820 each can have a different inclination and a different length.

And depending on the distance from the light source, length or inclination of the fore-face 810 and the back-face 820 can be different each other.

Here, the fore-face 810 is the surface that reflects the spill light out of the incident light. On the other hand the light being reflected by another irregular pattern can be incident into the back-face 320. Or according to another embodiment of the present invention any light may not be incident.

The fore-face 810 may be a concave surface. In case of a concave surface, an incident angle of the light incident to the fore-face 810 can be small and a reflection angle can be also small.

If the reflection of the spill light is large, the spill light may not be out from the pass-through tunnel 230 (i.e. not reflected toward the light source direction), and may be reflected repeatedly.

The spill light can be out toward the light source or extinct in the pass-through tunnel 230. If the spill light is out to the opposite direction of the light source, the efficiency of elimination of the spill light can become lower.

Therefore, if the fore-face 810 is formed in a concave curve, an incident angle and reflection angle of the spill light into the fore-face 810 become small, so that the spill light incident into the pass-through tunnel 230 may be reflected back to the light source direction. Therefore, the efficiency of elimination becomes better.

To get better efficiency in the elimination of the spill light, beside the way shown in FIG. 5 or described above, various methods can be used. Specially, the shape, inclination, length of the irregular pattern and shape or radius of the pass-through tunnel can be varied. Therefore it is apparent that a method in FIG. 8 is just one example and not limiting the scope of the present invention.

According to an embodiment of the present invention, the spill light removing device may eliminate spill light incident with random directions.

By eliminating the spill light, the efficiency of display may be improved.

And by the spill light removing device according to the present invention, the spill light incident into the inside of a diaphragm may be reflected and may not allow passing through the diaphragm, so that the spill light in an optical module may be eliminated.

According to the present invention, the spill light removing device can be applicable to an optical module easily due to its simple structure.

Also, by the spill light removing device according to the present invention, C/R(Contrast Ratio) of an image displayed may be improved.

What is claimed is:

1. A spill light removing device, comprising:
    a first blocker which is located perpendicularly to a stream route of the light being irradiated from a light source and blocks a stream of the light that is incident to the surface of the first blocker, except to a hole formed on the first blocker;
    a pass-through tunnel which is connected to the hole and is formed in the same direction to the stream route of the light and allows the stream of the light to pass through;
    a second blocker which has a irregularity pattern that is formed on a inner wall of the pass-through tunnel and reflects the light that is incident in the deviated direction of the stream route of light.

2. The spill light removing device of claim 1, further comprising:
    a collimating lens which parallelizes the light that is irradiated from the light source or the pass-through tunnel to a light axis.

3. The spill light removing device of claim 1, wherein the second blocker is a screw thread shaped.

4. The spill light removing device of claim 1, wherein a radius of the pass-through tunnel is decreasing with being further from the light source.

5. The spill light removing device of claim 1, wherein at least one of the height and inclination of the irregularity pattern on the second blocker is varied with the distance from the light source.

6. The spill light removing device of claim 1, wherein the irregularity pattern on second blocker comprises a curved surface on one side.

7. The spill light removing device of claim 1, wherein the surface of the irregularity pattern to the light source direction is a concave curve.

* * * * *